(12) United States Patent
Watanabe et al.

(10) Patent No.: US 6,312,841 B1
(45) Date of Patent: Nov. 6, 2001

(54) SUBSTRATE FOR INFORMATION RECORDING MEDIUM AND METHOD OF PRODUCING IT, AND INFORMATION RECORDING MEDIUM COMPRISING THE SUBSTRATE

(75) Inventors: Takashi Watanabe; Kazuaki Hashimoto, both of Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/340,188

(22) Filed: Jun. 28, 1999

(30) Foreign Application Priority Data

Jun. 30, 1998 (JP) .................................................. 10-199773

(51) Int. Cl.⁷ ...................................................... G11B 5/66
(52) U.S. Cl. ............................. 428/694 ST; 428/694 SG; 428/900; 427/128; 427/129; 427/130
(58) Field of Search ..................... 428/694 ST, 694 SG, 428/900; 427/128–130

(56) References Cited

U.S. PATENT DOCUMENTS

| | | | |
|---|---|---|---|
| 3,583,850 | * | 6/1971 | Bortholou et al. . |
| 3,583,858 | | 6/1971 | Bartholomew ...................... 65/30.14 |
| 5,874,376 | * | 2/1999 | Taguchi .................................. 501/63 |
| 6,174,824 | * | 1/2001 | Goto ......................................... 501/4 |
| 6,187,441 | * | 2/2001 | Takeuchi .............................. 428/410 |
| 6,191,058 | * | 2/2001 | Yamaguchi .............................. 501/4 |

FOREIGN PATENT DOCUMENTS

| | | |
|---|---|---|
| 57 129840 | 8/1982 | (JP) . |
| 58 049636 | 3/1983 | (JP) . |
| 11-503403 | 3/1999 | (JP) . |

* cited by examiner

*Primary Examiner*—Leszek Kiliman
(74) *Attorney, Agent, or Firm*—Sughrue, Mion, Zinn Macpeak & Seas, PLLC

(57) ABSTRACT

To produce a substrate for information recording media, a substrate consisting essentially of glass for information recording media is subjected to treatment for retarding the extract of the glass component from the substrate by contacting it with a molten salt that contains at least one of hydrogensulfates and pyrosulfates, while being subjected to additional treatment for retarding the crystallization of the molten salt. In the method, preferably, the glass component to be prevented from being extracted from the substrate is a group of alkali ions, and the treatment for retarding the crystallization of the molten salt is water addition treatment of any one of treatment of supplying water to the molten salt or treatment of compensating for water being away from the molten salt.

19 Claims, 1 Drawing Sheet

Figure 1:
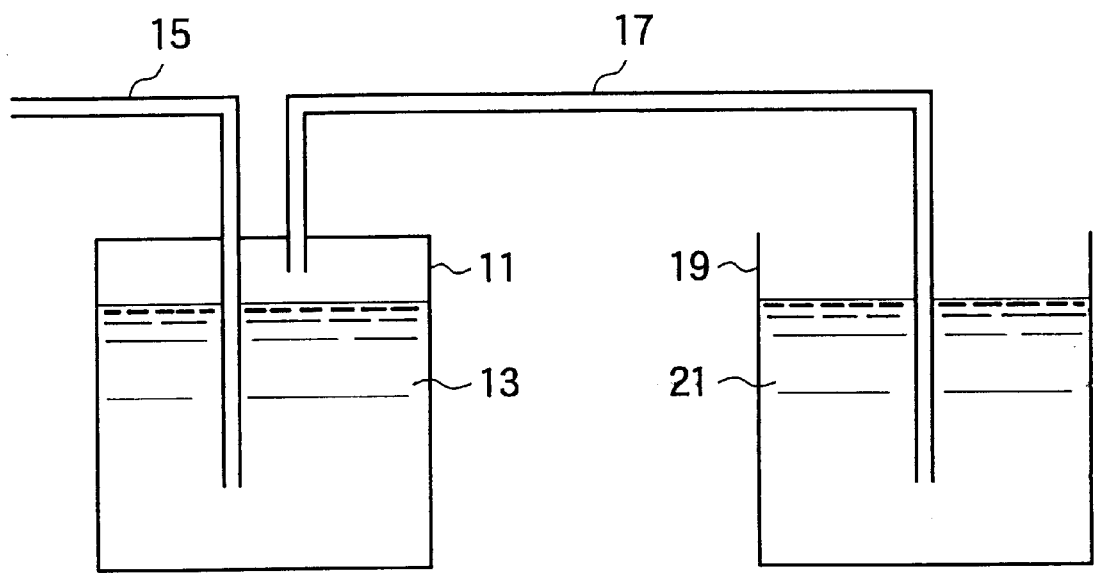

SUBSTRATE FOR INFORMATION RECORDING MEDIUM AND METHOD OF PRODUCING IT, AND INFORMATION RECORDING MEDIUM COMPRISING THE SUBSTRATE

BACKGROUND OF THE INVENTION

1. Field of the Invention

The present invention relates to a substrate for an information recording medium, to a method of producing the substrate, and to an information recording medium comprising the substrate.

2. Description of the Related Art

As a substrate for an information recording medium, attention is recently directed to a glass substrate and a ceramic substrate which are excellent in various properties as compared with other substrates. For example, an aluminum substrate has been widely used as a substrate for a magnetic disk. With a demand for reduction in size and thickness of the magnetic disk and for a low flying height of a magnetic head, the glass substrate and the ceramic substrate become more and more widely used. This is because the glass substrate and the ceramic substrate can be readily reduced in size and thickness and has an excellent flatness so that the flying height of the magnetic head can easily be lowered as compared with the aluminum substrate.

In the case of using the glass substrates for information recording media, their surface is often subjected to chemical strengthening treatment to increase their strength in order to improve their impact resistance and vibration resistance to thereby prevent them from being broken by shock or vibration.

For the chemical strengthening treatment, for example, an ion-exchanging method is much employed in which the alkali ions in glass are substituted with other alkali ions having a larger ionic radius to thereby increase the volume of the ion-exchanged site in the glass processed. In that method, the increase in the volume of the ion-exchanged site gives strong compression stress to the surface layer of the glass processed whereby the glass surface is strengthened. In the ion-exchanging method for chemical strengthening, the glass substrates to be processed must contain alkali ions because of the principle of the method itself. In some types of glass for substrates for information recording media, containing alkali ions are known which have a predetermined strength even without being subjected to chemical strengthening treatment, for example, high-valence glass.

On the other hand, for ceramic substrates for information recording media, such as crystal glass substrates, in general, they do not require chemical strengthening treatment as their impact resistance and vibration resistance are generally increased through crystallization.

Using glass or ceramic substrates in information recording media is often problematic in that the alkalis existing in the glass or ceramic substrates are extracted out, and it is desirable to minimize the alkali extract from those substrates. Even the ion-exchanged glass substrates give the trouble of alkali extract from them.

As mentioned above, the problem with glass or ceramic substrates for information recording media is the alkali extract from them, but, at present, no high-level technique of preventing the alkali extract is known.

SUMMARY OF THE INVENTION

It is an object of the present invention to provide a glass substrate, from which extract alkali and other components is prevented at a high level, and to provide a method for producing it.

It is another object of the present invention to provide a substrate for information recording media and a method for producing it, in which treatment of a substrate for alkali extract retardation is effected continuously and uniformly for a long period of time and the effect of the treatment lasts long.

It is still another object of the present invention to provide an information recording medium comprising the substrate.

According to one aspect of the present invention, there is provided an information recording medium which comprises a substrate containing a glass as a main component, an underlying layer formed on the substrate, a magnetic layer formed on the underlying layer, a protective layer formed on the magnetic layer outside the direction in which the layers are laminated, and a lubricative layer formed on the protective layer. In the information recording medium, the substrate is subjected to treatment for retarding the extract of alkali ions of the glass component from the substrate by contacting it with a molten salt that contains at least one of hydrogensulfates and pyrosulfates and to treatment for retarding the crystallization of the molten salt.

According to another aspect of the present invention, there is provided a substrate for information recording media, which containing a glass as a main element. The substrate is subjected to treatment for retarding the extract of alkali ions of the glass component from the substrate by contacting it with a molten salt that contains at least one of hydrogensulfates and pyrosulfates and to treatment for retarding the crystallization of the molten salt.

According to still another aspect of the present invention, there is provided a method of producing a substrate for information recording media, in which a substrate for information recording media that contains a glass as a main component is subjected to treatment for retarding the extract of the glass component from the substrate by contacting it with a molten salt that contains at least one of hydrogensulfates and pyrosulfates, before, during, or after being subjected to additional treatment for retarding the crystallization of the molten salt.

In the last aspect, preferably, the glass component of which the extract from the substrate is retarded is a group of alkali ions. Also preferably, the treatment for retarding the crystallization of the molten salt is water addition treatment of any one of treatment of supplying water to the molten salt or treatment of compensating for water being away from the molten salt.

Still preferably, the water addition treatment in the last aspect of the invention is effected by any one of a method of introducing steam into the molten salt, a method of putting the molten salt in a-steam atmosphere, or a method of adding a hydrogensulfate to the molten salt.

BRIEF DESCRIPTION OF THE INVENTION

Figure 2:
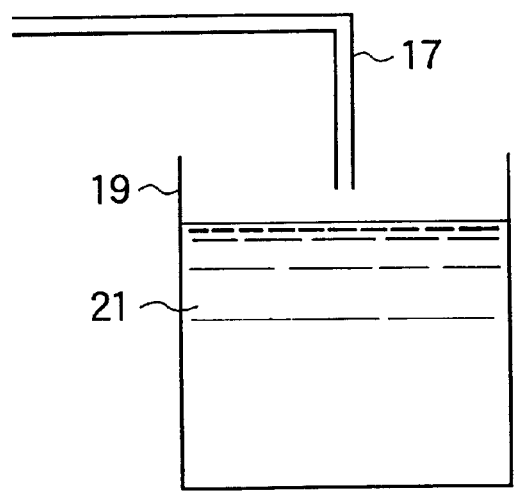

FIG. 1 is a schematic view showing one embodiment of the steam supplying method; and FIG. 2 is a schematic view showing another embodiment of the steam supplying method.

DESCRIPTION OF THE PREFERRED EMBODIMENTS

The present invention will be described in detail hereinunder.

Japanese Unexamined Patent Publication (JP-A) No. 11-503403 discloses a technique in which dealkalization on the substrate is carried out by sublimation of sulfate salt, such as $(NH_4)_2SO_4$ or by a wet treatment under condition of existence of $AlCl_3$. $AlCl_3$ is used for treatment at a relatively low temperature. when use is made of $AlCl_3$, treatment is carried out at a low temperature of 100° C. Thus, it takes long time of 24 hours for treatment.

When use is made of sublimation of sulfate salt, the sulfate salt should be made to be vaporized. Thus, the treatment requires a high temperature of 450–580° C.

On the other hand, in the present invention, the treatment carried out at a relatively low temperature, which is 250–300° C. in Examples which will be described hereinafter, for a short time of about 5 minutes. Because dealkalization is carried out to contact with the sulfate salt as a molten salt at a molten temperature at which the substrate melts. Thereby, the substrate glass has a merits in that the glass with a wide range of Tg, such as low Tg temperature glass or in that deformation of glass is not led owing to low temperature treatment.

To be concrete, in the present invention, a glass substrate can be applied that has up to about 400° C. of Tg.

During recording or reading information, a distance of 40–50 nm is required between the glass substrate for information recording medium and a magnetic head. When the glass substrate is deformed, a problem of head crush takes place. Therefore, it is a matter to be deformed in the glass substrate for information recoading medium.

Furthermore, in JP-A 11-503403, the glass is subjected to chemically strengthening treatment at 500° C. and, thereafter to dealkalization with $(NH_4)_2SO_4$ at 500° C. When dealkalization is carried out at the same temperature as the chemically strengthening treatment, Stress relaxation takes place to decrease in a strength of the substrate, resulting in lowering the strength of substrate to be used for information recording medium.

On the other hand, in the present invention, dealkalization is carried out for a short time of 5 minutes at a temperature 80–130° C. lower than that in the chemically strengthening treatment, so that stress relaxation can hardly take place.

Moreover, in sublimation of sulfate salt, the treatment should be carried out under an airtight condition because the sulfate is made to be gas or vapor. Therefore, it is difficult to continuously operate.

On the other hand, in the present invention, the treatment need not be carried out under an airtight condition, so that continuous operation is possible.

In addition, when dealkalization, the treatment is carried out for suppressing crystallization of molten salt. Therefore, continuous operation is possible to exhibit a durable effect of dealkalization.

The present applicant has already found that immersing alkali ion-containing substrates for information recording media in a molten salt of, for example, hydrogensulfates and others is significantly effective for retarding the alkali extract from the substrates, and has previously filed a patent application for the technique (Japanese Patent Application No. 9-365326).

It is believed that the reason for the mechanism why immersing glass substrates in a molten salt of, for example, hydrogensulfates and others results in high-level retardation of alkali extract from the glass substrates is because the non-bridged Si—O—Na bond existing in the outermost surface layer of glass is subjected to ion exchange between $Na^+$ in the Si—O—Na bond and the hydronium ion from water contained in the hydrogensulfate to give a silanol group (Si—O—H) and the silanol group is then dehydrated under heat to be a bridged Si—O—Si bond on the glass surface.

We, the present inventors have further studied, and, as a result, have found that, when the treatment of glass substrates with a molten salt of a hydrogensulfate (e.g., $KHSO_4$) or the like is continued as such, then water vaporizes out of the system to give crystals of a pyrosulfate (e.g., $K_2S_2O_7$) whereby the effect of the treatment is attenuated. (For example, through the reaction of $2KHSO_4 \rightarrow K_2S_2O_7 + H_2O \diamond$, $KHSO_4$ is converted into $K_2S_2O_7$.) We have further found that supplying water to the processing system ensures continuous and uniform treatment of glass substrates with the molten salt for a long period of time, and the effect of the treatment is not attenuated. On the basis of these findings, we have completed the present invention. We have still further found that the effect to be enhanced by water supply applies to all types of glass and ceramics, for example, even to crystallized glass. In addition in the glass substrate, alkali components cause staining or weathering of optical glass or glass tableware. Therefore, the treatment of molten salt, such as hydrogensulfate, is effective for glass articles excellent in weatherproof, such as, optical lens, optical prism, optical filter, or the like.

We have additionally found that, according to the technique which we have found, not only alkalis but also alkaline earth elements, Si, Pb and other components that may be extracted from substrates for information recording media could also be prevented from being extracted from them.

According to the present invention, the method of producing a substrate for information recording media is characterized in that a substrate for information recording media that consists essentially of glass is subjected to treatment for retarding the extract of the glass component from the substrate by contacting it with a molten salt that contains at least a hydrogensulfate and/or a pyrosulfate, while being subjected to additional treatment for retarding the crystallization of the molten salt.

For the treatment for retarding the crystallization of the molten salt, any means is employable. For example, employable is a method of supplying water to the molten salt (this includes a case of positively supplying water to the molten salt irrespective of the amount of water originally existing in the molten salt), or a method of compensating for water being away from the molten salt.

For the treatment of retarding the crystallization of the molten salt, further employable is a method of preventing water from vaporizing away by a steam pressure or by any other external pressure applied to the system, a method of effecting the treatment in a closed system, or the like, in place of the water-supplying method and the water-compensating method noted above. Where the method of effecting the treatment in a closed system is employed, in which the processing tank is surrounded by a closed space while the closed space is moistened to supply water to the treatment system and to prevent vaporization of water from the molten salt, surrounding the processing tank with such a closed space is expensive, and, in addition, SOx to be derived from the molten salt must be removed from the closed space. Therefore, special attention shall be paid to the closed system treatment.

The treatment of retarding the crystallization of the molten salt may be effected either before the contact of the substrate with the molten salt or during it. If desired, the processing liquid may be circulated outside the processing tank so that the treatment of retarding the crystallization of the molten salt could be effected in a separate device outside the processing tank in which the substrate is treated for alkali extract retardation. In this system, the processing liquid to be led into the processing tank is pre-treated in the separate device for retarding the crystallization of the molten salt therein.

Concrete methods for water supply to the molten salt or for compensation for water being away from the molten salt are mentioned below.

(a) The first method is to introduce steam into the molten salt. In this case, for example, a steam blowing nozzle is inserted into the molten salt so that the molten salt is bubbled with the steam being introduced thereinto through the nozzle in a known manner to attain the intended water supply or replenishment. More concretely, as shown in FIG. 1, water 13 in a closed container 11 is heated, for example, at around 100° C., air is fed into the water 13 in the closed container 11 through an air supply duct 15, then the moistened air is heated while it runs through a steam duct 17 to give steam having a temperature of, for example, around 280° C., and the hot steam is introduced into a molten salt 21 in a processing tank 19 via the nozzle at the tip of the steam duct 17. In that manner, water may be supplied or replenished to the molten salt 21.

The temperature of the steam is preferably not lower than the temperature of the molten salt so that the molten salt is not cooled and crystallized by the steam introduction.

(b) The second method is to put the molten salt in a steam atmosphere. For this, for example, steam is jetted toward the molten salt 21 through the nozzle at the tip of the steam duct 17 as disposed above the molten salt 21, as shown in FIG. 2, to attain the intended water supply or replenishment.

(c) The third method is to add a hydrogensulfate or a hydrogensulfate hydrate to the molten salt to prevent the crystallization of the molten salt. In this case, the volume of the molten salt being used for the treatment shall increase.

(d) Another method is to directly supply water to the molten salt. In this case, however, directly adding water to a high temperature molten salt brings about steam explosion. Therefore, the molten salt must be once cooled to around room temperature, then water is added thereto for gentle reaction, and thereafter the molten salt is again heated up to the processing temperature.

The pyrosulfate for use in the invention is a salt of pyrosulfuric acid ($H_2S_2O_7$), including compounds as prepared through reaction of sulfur disulfide ($S_2O_7$) with an alkali metal, an alkaline earth metal, any other metal, ammonium or the like. Removing one mol of water from 2 mols of a hydrogensulfate gives a pyrosulfate. When melted to be a molten salt, a hydrogensulfate loses water to be a pyrosulfate. In this case, the water from the hydrogensulfate vaporizes, but a minor amount of water still remaining in the molten salt participates in the mechanism of alkali extract retardation.

The pyrosulfate includes alkali metal, alkaline earth metal, ammonium, zinc, thallium(I), zinc(II), iron(II) and uranyl salts, etc. From their safety and handlability and from the viewpoint of environmental protection and economical aspects, preferred are potassium pyrosulfate, sodium pyrosulfate, etc.

The hydrogensulfate includes alkali metal, such as Li, Na, K, Rb, and Cs, alkaline earth metal, such as Mg, Ca, Sr, and Ba, ammonium, thallium, lead, vanadium, bismuth and rhodium salts, etc. From their safety, preferred are potassium hydrogensulfate, sodium hydrogensulfate, etc.

The hydrogensulfate and/or the pyrosulfate can be used singly, but a mixture of the hydrogensulfate and the pyrosulfate may also be used. If desired, two or more different hydrogensulfates and/or two or more different pyrosulfates can be mixed for use in the invention. In that case, the mixing ratio of them can be suitably controlled. In addition, any other components may be added to the molten salt for use in the invention, not interfering with the effect of the invention.

Pyrosulfates may be produced by adding sulfuric acid to sulfates. Therefore, the pyrosulfate for use in the invention may be prepared by adding sulfuric acid to sulfates.

During long-term treatment of glass with a molten salt of hydrogensulfates and others, the alkali component as removed from glass gives sulfate crystals in the molten salt. However, the sulfate crystals, when contacted with sulfuric acid added thereto, are again back to hydrogensulfates and/or pyrosulfates.

Since sulfuric acid has no negative influence on the treatment of glass with a molten salt of hydrogensulfates and others, sulfuric acid may be previously added to the molten salt before sulfate crystals are formed in the molten salt.

The mode of "contacting" substrates for information recording media with a molten salt in the method of the invention includes the case of immersing the substrates in a molten salt and the case of contacting only one surface of the substrates with a molten salt.

The temperature of the molten salt is not specifically defined, so far as it is not lower than the melting point of the salt or not lower than the liquid-phase temperature thereof. The alkali extract retardation does not so much depend on the temperature of the molten salt to be used for it. Preferably, the temperature of the molten salt is not lower than 250 to 300° C., as the alkali extract from the processed glass could be zero or nearly zero. On the other hand, however, if the temperature of the molten salt is too high, the glass surface processed will be staining in blue and the surface hardness of the glass will lower. Herein, in the present invention, the term "staining in blue" is defined as follows. Water contact causes chemical reactions (ion exchange between cations in the glass and hydronium ions in water) which result in a silica-rich surface layer that causes an interference color on that layer. That is staining. The long-term reliability of information recording media as produced by forming a recording layer on the glass substrate will be poor. Therefore, the temperature of the molten salt is preferably not higher than 350 to 500° C. The uppermost limit of the temperature is 500° C. This is because if the temperature is higher than 500° C., the molten salt will readily decompose. In addition, if glass having been chemically strengthened through ion exchang-ing treatment is processed at too high temperatures, it will lose the chemically-strengthened layer and its strength will lower. Taking this into consideration, it is desirable that chemically-strengthened glass is processed with a molten salt at a temperature not higher than 300 to 350° C. From the viewpoints noted above, it is desirable that the temperature of the molten salt falls between the melting point or the liquid-phase temperature of itself and 500° C., more preferably between the melting point or the liquid-phase temperature thereof and 350° C. For glass not chemically strengthened, the temperature preferably falls between 250° C. and 350° C., more preferably between 270° C. and 350° C. For chemically-strengthened glass, the temperature preferably falls between 250° C. and 300° C., more preferably between 270° C. and 300° C.

The melting point of potassium pyrosulfate is 325° C. (known in literature), but, in general, a part of it absorb water to be a hydrogensulfate. Therefore, potassium pyrosulfate is in a molten condition even at 210 to 300° C. In that manner, the melting point of some salts often differs from the temperature at which they actually melt. The melting point of potassium hydrogensulfate is 210° C., and that of sodium hydrogensulfate is 185.7° C.

Regarding the time for processing glass with the molten salt in the method of the invention, the alkali extract retardation does not so much depend on the processing time. For example, so far as the processing time is not shorter than 5 minutes or so, prolonging the processing time more than it gives any significant change in the alkali extract retardation. Therefore, the processing time with the molten salt preferably falls between 1 and 30 minutes or so. Taking the processing efficiency and the producibility into consideration, the time is more preferably from 5 to 10 minutes or so.

Substrates for information recording media as treated with a molten hydrogensulfate are not damaged at all by the treatment. Treatment with a molten pyrosulfate is effective for removing iron powder and other contaminants from the substrates, while being further effective for removing the salt precipitate as formed on the substrates during the treatment for chemical strengthening.

The substrate consisting essentially of glass, to which the invention is directed, is meant to include substrates of amorphous glass, glass ceramics, crystallized glass, glass-ceramic composite materials, etc.

For glass substrates, generally used is glass having $SiO_2$ as a network former. Some glass substrates contain alkali ions, but some others do not. Many crystallized glass substrates for information recording media contain alkali ions, but some crystallized glass does not contain alkali ions. The substrates for information recording media that are processed according to the invention are not specifically defined in their size, thickness, shape, etc.

For alkali ion-containing glass substrates, for example, mentioned are (i) aluminosilicate glass; (ii) high-valence metal ion-containing silicate glass that contains high-valence metal ions of Ti, Y, etc.; (iii) soda lime glass; (iv) soda aluminosilicate glass; (v) aluminoborosilicate glass; (vi) borosilicate glass; (vii) chain silicate glass, etc.

Aluminosilicate glass and the like are preferably subjected to chemical strengthening for the purpose of improving their impact resistance and vibration resistance. However, for alkali ion-containing glass substrates not requiring chemical strengthening, it is unnecessary to subject them to chemical strengthening.

As the aluminosilicate glass (i), preferred are glass consisting essentially of, by weight, 62 to 75% $SiO_2$, 5 to 15% $Al_2O_3$, 4 to 10% $Li_2O$, 4 to 12% $Na_2O$, and 5.5 to 15% $ZrO_2$, in which the ratio by weight of $Na_2O/ZrO_2$ falls between 0.5 and 2.0 and the ratio by weight of $Al_2O_3/ZrO_2$ falls between 0.4 and 2.5 and which shall be subjected to chemical strengthening; and glass consisting essentially of, by weight, 62 to 75% $SiO_2$, 5 to 15% $Al_2O_3$, 0.5 to 5% $B_2O_3$, 4 to 10% $Li_2O$, 4 to 12% $Na_2O$, 0.5 to 5% MgO, 0.5 to 5% CaO, and 0.01 to 1.0% $Sb_2O_3$, which shall also be subjected to chemical strengthening.

Undissolved $ZrO_2$ often roughens the surface of glass substrates. For ensuring its smooth surface, it is preferred that glass consists essentially of 57 to 74 mol % $SiO_2$, 0 to 2.8 mol % $ZrO_2$, 3 to 15 mol % $Al_2O_3$, 7 to 16 mol % $Li_2O$, and 4 to 14 mol % $Na_2O$, which shall be subjected to chemical strengthening when used for substrates.

Through chemical strengthening, the properties of aluminosilicate glass having the composition noted above are much improved. Specifically, three parameters of the compression stress, the tensile stress and the depth of the compression stress layer of the glass substrates are well balanced, and, in addition, the glass substrates have the advantages of transverse rupture strength, heat resistance, little Na precipitation even at high temperatures, surface smoothness and high Knoop hardness.

For crystallized glass substrates, for example, usable are crystallized glass of which the main crystal phase comprises lithium disilicate ($Li_2O.2SiO_2$) and α-quartz ($SiO_2$); and glass of which the main crystal phase comprises potassium fluororichterite ($KNaCaMg_5Si_8O_{22}F_2$) and potassium canasite ($K_3Na_3Ca_5Si_{12}O_{30}F_4$). For their concrete compositions, the former comprises, by weight, 60 to 86% $SiO_2$, 8 to 18% $Li_2O$, 0 to 10% $K_2O$, 0 to 8% MgO, 0 to 10% ZnO, 0 to 2% $Sb_2O_3$, and 0.1 to 10% $P_2O_5$, and the latter comprises, by weight, 50 to 75% $SiO_2$, 4 to 15% CaO, 5 to 30% MgO, 3 to 8% F, 2 to 9% $Na_2O$, 0 to 3% $Li_2O$, 0 to 2% of BaO, and 0 to 10% $Al_2O_3$.

In the invention, if desired, the glass substrate to be processed is immersed in a caustic, chemically-strengthening liquid to attain ion exchange between the ions in the surface layer of the glass substrate and the ions in the chemically-strengthening liquid, and the resulting, chemically-strengthened glass substrate is subjected to the treatment with a molten salt noted above.

For the ion exchange treatment, known are low-temperature ion exchange, high-temperature ion exchange, surface crystallization, etc. Preferred is low-temperature ion exchange as the substrates subjected to it could readily have high strength and are not deformed.

One method of low-temperature ion exchange comprises substituting the alkali ions in glass with other alkali ions having a larger ionic radius at a temperature not higher than the glass transition point (Tg), to thereby increase the volume of the ion-exchanged site in the glass processed. In that method, the increase in the volume of the ion-exchanged site gives strong compression stress to the surface layer of the glass processed whereby the glass surface is strengthened.

As the chemically-strengthening liquid, for example, usable are a molten salt of potassium nitrate ($KNO_3$), sodium nitrate ($NaNO_3$), potassium carbonate ($K_2CO_3$) or the like; a molten salt of a mixture of these (e.g., $KNO_3$+ $NaNO_3$, $KNO_3$+$K_2CO_3$, etc.); a molten salt comprising any of those salts and any other salts with ions of Cu, Ag, Rb, Cs, etc.

In view of the glass transition point, the heating temperature preferably falls between 350° C. and 650° C., more preferably between 350° C. and 500° C., even more preferably between 350° C. and 450° C.

The time for immersion preferably falls between 1 hour and 20 hours or so, in view of the transverse rupture strength and the compression stress layer of the glass substrates processed.

The thickness of the compression stress layer to be formed on the surface of the glass substrates preferably falls between 60 and 300 μm or so, for the purpose of increasing the impact resistance and the vibration resistance of the glass substrates.

In the invention, it is desirable that the glass substrates are pre-heated at 200 to 350° C. prior to being subjected to the treatment with a molten salt (a molten salt of hydrogensulfates and others, or a molten salt of chemically-strengthening liquids), for the purpose of preventing the glass substrates from being broken or cracked.

In the treatment with a molten salt of hydrogensulfates and others or with a molten salt of chemically-strengthening liquids, it is desirable that the glass substrates are supported by a stand at their edges. This is because, if the glass substrates are supported at a part of their surface, that part supported could not be processed with the molten salt. Supporting the glass substrates at their edges evades the problem.

In the invention, it is desirable that, after the glass substrates have been processed with a molten salt of hydrogensulfates and others and/or a molten salt of chemically-strengthening liquids, they are drawn out from the molten liquid and then gradually cooled to a pre-determined temperature so as not to have thermal strain. Cooling them evades their damage by thermal strain.

The cooling rate at which the glass substrates are gradually cooled preferably falls between 2° C./min and 100° C./min, more preferably between 5° C./min and 60° C./min, even more preferably between 10° C./min and 50° C./min.

In the invention, it is also desirable that, after having been gradually cooled in the manner noted above, the glass substrates are then rapidly cooled (quenched), for example, at a rate at which the molten salt being precipitated on the surface of the glass substrates is prevented from being crystallized. Quenching the glass substrates embrittles the precipitate from the molten salt and makes it easy to remove the molten salt from the glass substrates in the step of processing the glass substrates with a molten salt of hydrogensulfates and others and in the step of washing the processed glass substrates.

The quenching rate at which the glass substrates are quenched preferably falls between 1600° C./min and 200° C./min, more preferably between 1200° C./min and 300° C./min, even more preferably between 800° C./min and 400° C./min. Quenching the glass substrates is preferably effected by contacting them with a coolant at a temperature falling between 100° C. and 0° C., more preferably between 40° C. and 10° C., so as to evade the heat shock of the substrates.

The time for which the glass substrates are kept in contact with the coolant preferably falls between 10 minutes and 60 minutes or so. In the washing step, it is easy to remove the salt precipitate from the glass substrates thus processed with the coolant in that condition.

The coolant employable herein includes liquid coolants such as water, warm water, solutions, etc.; and vapor coolants such as nitrogen gas, steam, cooled air, etc. In place of those, air blasting is also employable.

In the invention, the surface of glass substrates optionally subjected to chemical strengthening treatment of that of glass substrates not subjected to chemical strengthening treatment is processed with a molten salt of hydrogensulfates and others. The molten salt process is carried out at a temperature at least 50° C., preferably at least 60, more preferably at least 80° C., lower than that in the chemically strengthening treatment.

In the present invention, if desired, the glass substrates being produced may be subjected to any known washing treatment after any step of the production ocess. The washing treatment includes washing with commercially-available detergents such as neutral detergents, surfactants, alkaline detergents, etc.; as well as scrubbing, pure water washing, solvent washing, solvent vapor drying, centrifugal drying, etc. The washing treatment may be effected under heat or in ultrasonic waves.

The ultrasonic waves may be of any type, including those of a multi-frequency type that oscillate within a certain frequency range, and those of a fixed frequency type that oscillate at a fixed frequency. Ultrasonic waves having a lower frequency have a higher washing effect, but their damage to glass substrates is larger. Taking the matters into consideration, the frequency of the ultrasonic waves to be employed shall be determined.

Vapor drying gives few stains to the glass substrates, as the drying rate is high. The solvent for vapor drying includes, for example, isopropyl alcohol, flons (fluorocarbons), acetone, methanol, ethanol, etc.

In the present invention, the method of producing substrates for information recording media is applicable to production of glass substrates for magnetic disks, glass substrates for photomagnetic disks, substrates for electrooptic disks such as optical memory disks, etc.

In particular, the substrates for information recording media of the invention are favorable to glass substrates to be used in magnetic disks that are reproduced with magnetoresistance heads. Precisely, the surface condition of the glass substrates as produced according to the invention is much better than that of other substrates as produced according to prior art techniques. The glass substrates of the invention, when used in magnetic disks for magnetoresistance heads, do not cause head crush, since they do not extract alkalis and are not burnt to give impurities on the surface of the magnetic disks. In addition, the magnetic layers and other layers in the magnetic disks incorporating the glass substrate of the invention do not have defects to cause errors. In many magnetic disks, defects of the magnetic layers are often caused by alkalis extracted from substrates and by impurities formed in staining substrates.

The treating method of the invention has many applications in various technical fields in which extract of constituent components, such as alkali metals, alkaline earth metals, silicon, lead and others, from glass and ceramics must be prevented.

The Information recording medium of the invention will be mentioned below.

The information recording medium of the invention is characterized in that at least a recording layer is formed on the substrate as produced according to the method of the invention noted above. The recording layer and other layers to be formed on the substrate may be any known ones.

The information recording medium of the invention incorporates the substrate from which extract alkali ions and others is significantly prevented to a high degree. Therefore, the weather resistance of the medium is high, the life thereof is long, and the reliability thereof is high.

As one example of the information recording medium of the present invention, a magnetic recording medium hereinunder will be mentioned.

The magnetic recording medium of the invention may be fabricated by forming an underlying layer, a magnetic layer, a surface-roughened layer, a protective layer, a lubricative layer and other optional layers in any desired order on a substrate for magnetic disks.

In the magnetic recording medium, the underlying layer shall be determined, depending on the magnetic layer therein.

For example, the underlying layer may comprise at least one non-magnetic metal selected from Cr, Mo, Ta, Ti, W, V, B, Al, etc. When combined with Co-based magnetic layers, preferred are underlying layers of a simple substance Cr or of a Cr alloy. The underlying layer is not limited to only single-layered ones, but may have a multi-layered structure composed of a plurality of layers of the same substance or different substances. For example, the multi-layered underlying layer includes Cr/Cr, Cr/CrMo, Cr/CrV, CrV/CrV, Al/Cr/CrMo, Al/Cr/Cr, etc.

The material for the magnetic layer is not specifically defined. Concretely, for example, employable are Co-based, thin magnetic films of CoPt, CoCr, CoNi, CoNiCr, CoCrTa, CoPtCr, CoNiPt, CoNiCrPt, CoNiCrTa, CoCrPtTa, CoCrPtSiO, etc. The magnetic layer may also have a multi-layered structure, which comprises a plurality of magnetic layers as separated by a nonmagnetic film (of, for example, Cr, CrMo, CrV, etc.) existing therebetween. The multi-layered magnetic layer has the advantage of noise attenuation. As its examples, mentioned are CoPtCr/CrMo/CoPtCr, CoCrTaPt/CrMo/CoCrTaPt, etc.

The magnetic layer applicable to magnetoresistance heads (MR heads) or giant magnetoresistance heads (GMR heads) may comprise a Co-based alloy to which is added an impurity element selected from Y, Si, rare earth elements, Hf, Ge, Sn and Zn, or an oxide of any of those impurity elements.

Apart from its examples noted above, the magnetic layer may have a ferrite structure or an iron-rare earth element composite structure, or may also have a granular structure comprising magnetic grains of Fe, Co, FeCo, CoNiPt or the like as dispersed in a nonmagnetic film of $SiO_2$, BN or the like. The recording mode of the magnetic layer is not specifically defined. The magnetic layer may be any of in-plane recording ones or antiplane vertical recording ones.

The surface-roughening layer is provided in the medium for controlling the surface roughness of the medium. The method of forming the surface-roughening layer and the material for the layer are not specifically defined. The position at which the surface-roughening layer is provided in the medium is not also specifically defined.

In magnetic recording disks for non-contact recording system devices, the surface-roughening layer is to roughen the surface of the disks in accordance with its roughness. With their surface being so roughened, the disks are protected from being in direct contact with magnetic heads, and their CSS durability is improved.

On the other hand, however, magnetic disks for contact recording system devices do not require the surface-roughening layer. This is because their surface is preferably as smooth as possible so as not to damage magnetic heads and even the disks themselves being driven in contact with magnetic heads.

The surface roughness, Ra of the surface-roughening layer preferably falls between 10 and 50 angstroms, more preferably between 10 and 30 angstroms.

When Ra is smaller than 10 angstroms, the surface of the magnetic recording medium is nearly planar. If so, the medium will be in direct contact with magnetic heads to damage the magnetic heads and even the medium itself. As the case may be, the magnetic head will be crushed to have fatal damage, if in contact with the medium on them. For these reasons, it is unfavorable that Ra is smaller than 10 angstroms. On the other hand, if Ra is larger than 50 angstroms, the glide height will be too large, thereby lowering the recording density. Therefore, it is unfavorable that Ra is larger than 50 angstroms.

Various materials for the surface-roughening layer and various methods for forming the layer are known, and any of those are employable herein with no specific limitation. For example, as the materials for the surface-roughening layer, employable are metals and metal alloys of Al, Ti, Cr, Ag, Nb, Ta, Bi, Si, Zr, Cu, Ce, Au, Sn, Pd, Sb, Ge, Mg, Sn, W, Pb, etc.; as well as oxides, nitrides and carbides of such metals and metal alloys. Preferred are a simple substance of Al and Al-based metallic compounds such as Al alloys, Al oxides (e.g., $Al_2O_3$), Al nitrides (e.g., AlN), etc., as their layers are easy to form.

The surface-roughening layer may be of a continuous texture film or may have island projections as separately distributed on its surface. The height of each island projection preferably falls between 100 and 500 angstroms, more preferably between 100 and 300 angstroms.

The surface roughness of the surface-roughening layer and the height of each island projection formed on the surface of the layer may be suitably controlled, depending on the material and the composition of the layer, the condition for heat treatment of the layer, etc.

As other means of roughening the surface of the information recording medium, employable is any of mechanical polishing, chemical etching or energy beam irradiation for modifying the texture of the surface, or their combinations.

The protective layer may be, for example, any of Cr film, Cr alloy film, carbon film, zirconia film, silica film, etc. The film for the protective layer may be formed successively with the other layers of underlying layer, magnetic layer, etc., in any continuous film-forming system of in-line-type or stationary facing-type sputtering devices. The protective layer may be a single-layered one or may have a multi-layered structure composed of a plurality of layers of the same substance or different substances.

In place of the protective layer noted above or in addition thereto, any other protective layers may be formed on the media. For example, in place of forming the protective layer noted above, a silicon oxide ($SiO_2$) film may be formed on the media. For forming the silicon oxide film, fine colloidal silica grains are dispersed in a tetraalkoxysilane as diluted with an alcoholic solvent, and the resulting dispersion is applied onto the media, which are then baked. The silicon oxide film acts both as the protective layer and as the surface-roughening layer.

Various types of lubricative layers are known. In general, a liquid lubricant comprises perfluoro-polyether (PFPE) or the like and is applied onto the media through dipping, spin-coating, spraying or the like, and then optionally heated to form a lubricative layer on the media.

Description will be made as regards Examples of producing the substrates for information recording media of the present invention below.

EXAMPLE 1

(1) Preparation of Glass Substrate

Doughnut disk substrates of high-valence metal ion-containing silicate glass (high Young's modulus glass with 600° C. of Tg) were prepared, having a hole at the center. These had an outer diameter of 2.5 inches, an inner diameter of 0.8 inches and a thickness of 0.25 inches.

The high-valence metal ion-containing silicate glass was comprised of 43 mol % of $SiO_2$, 5 mol % of $Al_2O_3$, 8 mol % of $Li_2O$, 2 mol % of $Na_2O$, 6 mol % of MgO, 19% of CaO, 15% of $TiO_2$ and 2% of $ZrO_2$.

(2) Chemically Strengthening Step

The glass substrates were washed and then subjected to chemically strengthening treatment.

For the chemical strengthening, prepared was a chemically-strengthening liquid of a mixture of potassium nitrate (60% by weight) and sodium nitrate (40% by weight). This liquid was heated at 480° C., and the glass substrates previously washed and pre-heated at 300° C. were immersed therein for about 4 hours. To ensure complete treatment of their entire surface, the glass substrates were all held in a holder with their edges being supported by the holder support.

Through the chemically strengthening treatment for which the glass substrates were immersed in the chemically-strengthening liquid, lithium ions and sodium ions existing in the surface layer of each glass substrate were substituted with sodium ions and potassium ions in the treating liquid, whereby the glass substrates were strengthened.

The thickness of the compression stress layer thus formed on the surface of each glass substrate fell between about 100 and 200 $\mu$m.

(3) Cooling Step, Washing Step

The chemically-strengthened glass substrates were gradually cooled in first and second cooling chambers in that order. First, the glass substrates were drawn out from the chemically-strengthening liquid, then transferred in the first cooling chamber having been heated at 300° C., and kept therein for about 10 minutes. In this step, the glass substrates were gradually cooled to 300° C. Next, the glass substrates were transferred from the first cooling chamber to the second cooling chamber having been heated at 200° C., in which the glass substrates having been at 300° C. were cooled to 200° C.

In the two-stage cooling step, the glass substrates being cooled did not receive thermal strain and were not damaged.

Next, the thus-cooled glass substrates were put into a water tank at 20° C., in which they were quenched for about 20 minutes.

After the glass substrates having been subjected to the cooling step in the manner mentioned above, they were then washed. For washing them, they were immersed in different washing tanks separately filled with neutral detergent, neutral detergent, pure water, pure water, IPA (isopropyl alcohol) and IPA (for vapor drying), in that order. Ultrasonic waves (having a frequency of 40 kHz) were applied to each washing tank.

(4) Treatment with Molten Salt

The glass substrates were immersed in and treated with a molten salt of a special-grade chemical, potassium pyrosulfate. Precisely, as shown in Table 1 below, steam (air: 2000 cm$^3$/min, steam: 1 g/min (this was calculated from the water loss/hr), steam temperature: 280° C.) was fed to the system for 2 or 4 hours prior to the treatment (samples 1, 2). For comparison, the glass substrates were treated in the same manner as above but no steam was fed to the system (comparative sample 1), or were not treated with the molten salt of potassium pyrosulfate (comparative sample 2). The temperature of the molten salt was 300° C., and the time for immersion was 5 minutes.

The thus-treated glass substrates were washed and then subjected to an alkali immersion test (alkali migration test) and an environmental test. The test data are shown in Table 1, from which it is known that the treatment with the molten salt of potassium pyrosulfate is effective.

TABLE 1

(type of glass: high valence ion-containing glass)

| | Method of Treatment | Immersion Test Total of Li, Na and K Extracts ($\mu$mol/disk) | Environmental Test | Surface Observation |
|---|---|---|---|---|
| Comparative Sample 1 | not treated with $K_2S_2O_2$ | 8.7 | many staining spots larger than 5 $\mu$m | O |
| Comparative Sample 2 | treated with $K_2S_2O_7$ (300° C., 5 min) | 0.2 | no staining spots larger than 5 $\mu$m | O |
| Sample 1 | treated with $K_2S_2O_7$ (300° C., 5 min) after steam supply for 2 hours | 0.2 | no staining spots larger than 5 $\mu$m | O |
| Sample 2 | treated with $K_2S_2O_7$ (300° C., 5 min) after steam supply for 4 hours | 0.2 | no staining spots larger than 5 $\mu$m | O |

Liquid-phase temperature of $K_2S_2O_7$: 210° C.

In the immersion test, the glass substrates were immersed in ultra-pure water at 80° C. for 24 hours, and the extracted components were quantified through ion chromatography. From the data, the amount of the alkali metal ions was obtained which had been extracted from one glass substrate ($\mu$mols/disk).

In the environmental test, the glass substrates were left in a high-temperature, high-humidity atmosphere having a temperature of 80° C. and a relative humidity of 80%, for 1 week. The surface of each substrate was observed with a microscope to check it for alkali chlorides and other precipitates thereon to be caused by alkali migration for surface.

EXAMPLE 2

Crystallized glass having, as the main crystal phase, lithium disilicate ($Li_2O.2SiO_2$) and $\alpha$-quartz ($SiO_2$), and comprising, by weight, 76.0% $SiO_2$, 9.7% $Li_2O$, 1.0% $Na_2O$, 3.5% $K_2O$, 1.5% MgO, 3.5% $Al_2O_3$, 3.0% $P_2O_5$, 1.5% $TiO_2$ and 0.3% $As_2O_3$ was heated at a heating rate of about 4.0° C./min, then kept at its nucleating temperature for 1.5 hours, thereafter further heated at a heating rate of about 2.0° C./min, and finally kept at 815° C. for 2.5 hours. Thus were prepared disk substrates of the crystallized glass.

The glass substrates were washed and then treated with a molten salt of potassium pyrosulfate in the same manner as in Example 1. These were subjected to the same immersion test and the same environmental test as in Example 1.

For comparison, the samples not treated with potassium pyrosulfate were subjected to the same tests. The test data are in Table 2 below.

From Table 2, it is known that treating the alkali-containing ceramic with a molten salt of potassium pyrosulfate is effective.

TABLE 2

(type of glass: crystallized glass)

| | Method of Treatment | Immersion Test Total of Li, Na and K Extracts ($\mu$mol/disk) | Environmental Test | Surface Observation |
|---|---|---|---|---|
| Comparative with Sample 3 | not treated $K_2S_2O_7$ | 4.8 | many staining spots larger than 5 $\mu$m aggregated | O |
| Comparative Sample 4 | treated with $K_2S_2O_7$ with no steam introduction (250° C., 5 min) | 0.1 | no staining spots larger than 5 $\mu$m | O |
| Sample 3 | treated with $K_2S_2O_7$ (250° C., 5 min) after steam supply for 2 hours | 0.1 | no staining spots larger than 5 $\mu$m | O |
| Sample 4 | treated with $K_2S_2O_7$ (250° C., 5 min) after steam supply for 4 hours | 0.1 | no staining spots larger than 5 $\mu$m | O |

Liquid-phase temperature of $K_2S_2O_7$: 210° C.

EXAMPLE 3

Crystallized glass having, as the main crystal phase, potassium fluororichterite and potassium canasite-, and comprising, by weight, 56.5% $SiO_2$, 11.8% MgO, 14.1% CaO, 5.4% $Na_2O$, 8.7% $K_2O$ and 5.5% F was heated at a

TABLE 3

(type of glass: crystallized glass)

| | Method of Treatment | Immersion Test Total of Li, Na and K Extracts ($\mu$mol/disk) | Environmental Test | Surface Observation |
|---|---|---|---|---|
| Comparative Sample 5 | not treated with $K_2S_2O_7$ | 1.7 | many staining spots larger than 5 $\mu$m aggregated | O |
| Comparative Sample 6 | treated with $K_2S_2O_7$ with no steam introduction (250° C., 5 min) | 0.1 | no staining spots larger than 5 $\mu$m | O |
| Sample 5 | treated with $K_2S_2O_7$ (250° C., 5 min) after steam supply for 2 hours | 0.1 | no staining spots larger than 5 $\mu$m | O |
| Sample 6 | treated with $K_2S_2O_7$ (250° C., 5 min) after steam supply for 4 hours | 0.1 | no staining spots larger than 5 $\mu$m | O |

Liquid-phase temperature of $K_2S_2O_7$: 210° C.

heating rate of about 4.0° C./min, then kept at its nucleating temperature for 1.5 hours, thereafter further heated at a heating rate of about 2.0° C./min, and finally kept at 840° C. for 2.5 hours. Thus were prepared disk substrates of the crystallized glass. The glass substrates were washed and then treated with a molten salt of potassium pyrosulfate in the same manner as in Example 1. These were subjected to the same immersion test and the same environmental test as in Example 1.

For comparison, the samples not treated with potassium pyrosulfate were subjected to the same tests. The test data are in Table 3 above.

EXAMPLE 4

For 110 kg of a molten salt of $K_2S_2O_7$ at 320° C., the relationship between the steam introduction time and the crystal precipitation time was investigated.

The data are in Table 4 below.

TABLE 4

| Condition | Crystal Precipitation | Remarks |
|---|---|---|
| No steam introduction | after 120 hours | |
| Steam introduction for 3 hours | after 220 hours | Air: 2000 cm$^3$/min Steam: 1 g/min |
| Continuous steam introduction | not precipitated | Air: 2000 cm$^3$/min Steam: 1 g/min |

In the system with no steam introduction thereinto, crystals precipitated after 120 hours. In the system with steam introduction thereinto for 3 hours, crystals precipitated after 220 hours. In the system with continuous steam introduction thereinto, no crystals precipitated.

EXAMPLE 5

Different water supplying methods were tested for the difference in crystal precipitation. The data are in Table 5 below.

TABLE 5

| Condition | Crystal Precipitation | Remarks |
|---|---|---|
| KHSO$_4$ added | after 72 hours | Amount of KHSO$_4$ added: 440 g |
| Steam introduction for 3 hours | after 100 hours | Air: 2000 cm$^3$/min Steam: 1 g/min |

After the crystals precipitated, water was added to both systems. In that condition, the time before the next crystal precipitation was 72 hours in the system to which potassium hydrogensulfate had been added, but was 100 hours in the system into which steam had been introduced for 3 hours. In two cases, the crystals precipitated immediately disappeared after the water addition.

EXAMPLE 6

The same process and the same immersion test and environmental test as in Example 1 were repeated, except that a molten salt of a special-grade chemical, sodium pyrosulfate, potassium hydrogensulfate or sodium hydrogensulfate was used in place of the molten salt of potassium pyrosulfate. The data are in Table 6 below.

TABLE 6

(type of glass: aluminosilicate glass containing high-valence ions ($TiO_2$, $Y_2O_3$, etc.))

| | Method of Treatment | Immersion Test Total of Li, Na and K Extracts ($\mu$mol/disk) | Environmental Test | Surface Observation |
|---|---|---|---|---|
| Sample 7 | treated with $Na_2S_2O_7$ (300° C., 5 min) after steam supply for 2 hours | 0.2 | no staining spots larger than 5 $\mu$m | O |
| Sample 8 | treated with $Na_2S_2O_7$ (300° C., 5 min) after steam supply for 4 hours | 0.2 | no staining spots larger than 5 $\mu$m | O |
| Sample 9 | treated with $KHSO_4$ (300° C., 5 min) after steam supply for 2 hours | 0.2 | no staining spots larger than 5 $\mu$m | O |
| Sample 10 | treated with $KHSO_4$ (300° C., 5 min) after steam supply for 4 hours | 0.2 | no staining spots larger than 5 $\mu$m | O |
| Sample 11 | treated with $NaHSO_4$ (300° C., 5 min) after steam supply for 2 hours | 0.2 | no staining spots larger than 5 $\mu$m | O |
| Sample 12 | treated with $NaHSO_4$ (300° C., 5 min) after steam supply for 4 hours | 0.2 | no staining spots larger than 5 $\mu$m | O |

Liquid-phase temperature of $Na_2S_2O_7$: 190° C.
Liquid-phase temperature of $KHSO_4$: 210° C.
Liquid-phase temperature of $NaHSO_4$: 190° C.

EXAMPLE 7

The same process and the same immersion test and environmental test as in Example 1 were repeated, except that a molten salt of a mixture of a special-grade chemical, potassium pyrosulfate and a special-grade chemical, sodium pyrosulfate, or a molten salt of a mixture of a special-grade chemical, potassium hydrogensulfate and a special-grade chemical, sodium hydrogensulfate was used.

The data are in Table 7 above.

TABLE 7

(type of glass: high-valence ion-containing glass)

| | Method of Treatment | Immersion Test Total of Li, Na and K Extracts ($\mu$mol/disk) | Environmental Test | Surface Observation |
|---|---|---|---|---|
| Sample 13 | treated with $Na_2S_2O_7$/$K_2S_2O_7$ (300° C., 5 min) after steam supply for 2 hours | 1.1 | no staning spots larger than 5 $\mu$m | O |
| Sample 14 | treated with $Na_2S_2O_7$/$K_2S_2O_7$ (300° C., 5 min) after steam supply for 4 hours | 1.2 | no staning spots larger than 5 $\mu$m | O |
| Sample 15 | treated with $NaHSO_4$/$KHSO_4$ (300° C., 5 min) after steam supply for 2 hours | 1.1 | no staning spots larger than 5 $\mu$m | O |
| Sample 16 | treated with $NaHSO_4$/$KHSO_4$ (300° C., 5 min) after steam supply for 4 hours | 1.2 | no staning spots larger than 5 $\mu$m | O |

$Na_2S_2O_7$/$K_2S_2O_7$ = 50 wt. %/50 wt. %
$NaHSO_4$/$KHSO_4$ = 50 wt. %/50 wt. %
Liquid-phase temperature of $Na_2S_2O_7$/$K_2S_2O_7$: 150° C.
Liquid-phase temperature of $NaHSO_4$/$KHSO_4$: 150° C.

EXAMPLE 8

The same process and the same immersion and environmental tests as those mentioned in Example 1 were repeated, except that a molten salt of potassium pyrosulfate and sulfuric acid as mixed in a ratio by weight of 1/1 was used. The data are shown in Table 8 below.

TABLE 8

(type of glass: high-valence ion-containing glass)

| | Method of Treatment | Immersion Test Total of Li, Na and K Extracts ($\mu$mol/disk) | Environmental Test | Surface observation |
|---|---|---|---|---|
| Sample 17 | treated with $K_2S_2O_7$ + sulfuric acid (300° C., 5 min) after steam supply for 2 hours | 0.2 | no staining spots larger than 5 $\mu$m | O |
| Sample 18 | treated with $K_2S_2O_7$ + sulfuric acid | 0.2 | no staining spots | O |

TABLE 8-continued (type of glass: high-valence ion-containing glass)

| Method of Treatment | Immersion Test Total of Li, Na and K Extracts (μmol/disk) | Environ- mental Test | Surface obser- vation |
|---|---|---|---|
| (300° C., 5 min) after steam supply for 4 hours | | larger than 5 μm | |

$K_2S_2O_7$/sulfuric acid = 50 wt. %/50 wt. %

EXAMPLES 9 to 11

The same process and the same immersion test and environmental test as those mentioned in Example 1 were repeated, except that aluminosilicate glass with Tg of 500° C. consisting essentially of 57 to 74 mol % $SiO_2$, 0 to 2.8 mol % $ZrO_2$, 3 to 15 mol % $Al_2O_3$, 7 to 16 mol % $Li_2O$, and 4 to 14 mol % $Na_2O$ and having been subjected to chemically-strengthening treatment at 400° C. for 3 hours (in Example 9), soda lime glass (in Example 10), soda aluminosilicate glass (in Example 11), or heavy metal ion-containing borosilicate glass was used in place of the high-valence metal ion-containing glass.

In the test, the same results as those mentioned in Example 1 were obtained. The data in Example 9 (in which was used aluminosilicate glass) are shown in Table 9 below.

In the examples above-mentioned, any stress relaxation can be hardly recognized in the substrates of Example 1 and 6–9, which are subjected to a chemically strengthening treatment and, thereafter a treatment with molten salt.

TABLE 9

(type of glass: aluminosilicate glass)

| | Method of Treatment | Immersion Test Total of Li, Na and K Extracts (μmol/disk) | Environ- mental Test | Surface Obser- vation |
|---|---|---|---|---|
| Compara- tive Sample 7 | not treated with $K_2S_2O_7$ | 2.0 | many staining spots larger than 5 μm aggregated | O |
| Compara- tive Sample 8 | treated with $K_2S_2O_7$ (250° C., 5 min) with no steam introduction | 0.1 | no staining spots larger than 5 μm | O |
| Compara- tive Sample 9 | treated with $K_2S_2O_7$ (300° C., 5 min) with no steam introduction | 0.0 | no staining spots larger than 5 μm | O |
| Sample 19 | treated with $K_2S_2O_7$ (250° C., 5 min) after steam supply for 2 hours | 0.1 | no staining spots larger than 5 μm | O |
| Sample 20 | treated with $K_2S_2O_7$ | 0.1 | no staining | O |

TABLE 9-continued (type of glass: aluminosilicate glass)

| | Method of Treatment | Immersion Test Total of Li, Na and K Extracts (μmol/disk) | Environ- mental Test | Surface Obser- vation |
|---|---|---|---|---|
| | (250° C., 5 min) after steam supply for 4 hours | | spots larger than 5 μm | |
| Sample 21 | treated with $K_2S_2O_7$ (300° C., 5 min) after steam supply for 2 hours | 0.0 | no staining spots larger than 5 μm | O |
| Sample 22 | treated with $K_2S_2O_7$ (300° C., 5 min) after steam supply for 4 hours | 0.0 | no staining spots larger than 5 μm | O |

Liquid-phase temperature of $K_2S_2O_7$: 210° C.

EXAMPLE 12

In the similar manner to Example 1, the glass substrate was treated and subjected to the immersion test other than that the amount of Si, Mg, and Ca ions were quantified. The data in Example 12 are shown in Table 10.

TABLE 10

(type of glass: high valence ion-containing glass)

| | | Immersion Test | |
|---|---|---|---|
| | Method of Treatment | Amount of Si Extract (μmol/disk) | Amount of Mg and Ca Extracts (μmol/disk) |
| Compara- tive Sample 11 | not treated with $K_2S_2O_7$ | 10 | 3.3 |
| Compara- tive Sample 12 | treated with $K_2S_2O_7$ (300° C., 5 min) | 4.4 | 1.5 |
| Sample 23 | treated with $K_2S_2O_7$ (300° C., 5 min) after steam supply for 2 hours | 4.4 | 1.5 |
| Sample 24 | treated with $K_2S_2O_7$ (300° C., 5 min) after steam supply for 4 hours | 4.4 | 1.5 |

Liquid-phase temperature of $K_2S_2O_7$: 210° C.

EXAMPLE 13

In similar manner to Example 1, excepting that the molten salt was potassium hydrogensulfate, the glass substrate was treated and subjected to the immersion test that the amount of Si, Mg, and Ca ions were quantified.

The data in Example 13 are shown in Table 11.

TABLE 11

(type of glass: high valence ion-containing glass)

|  | Method of Treatment | Immersion Test | |
|---|---|---|---|
|  |  | Amount of Si Extract (μmol/disk) | Amount of Mg and Ca Exctracts (μmol/disk) |
| Comparative Sample 13 | not treated with KHSO₄ | 10 | 3.3 |
| Comparative Sample 14 | treated with KHSO₄ (300° C., 5 min) | 4.5 | 1.6 |
| Sample 25 | treated with KHSO₄ (300° C., 5 min) after steam supply for 2 hours | 4.5 | 1.6 |
| Sample 26 | treated with KHSO₄ (300° C., 5 min) after steam supply for 4 hours | 4.5 | 1.6 |

Liquid-phase temperature of KHSO4: 210° C.

EXAMPLE 14

On the both surfaces of the glass substrates for magnetic disks that had been prepared in Examples 1 to 11, formed were an underlying layer of Al (thickness: 50 angstroms)/Cr (1000 angstroms)/CrMo (100 angstroms), a magnetic layer of CoPtCr (120 angstroms)/CrMo (50 angstroms)/CoPtCr (120 angstroms), and a protective layer of Cr (50 angstroms), in an in-line-type sputtering device.

The substrates were immersed in a solution of an organic silicon compound, in which were dispersed fine silica grains (grain size: 100 angstroms), and then baked to form a protective layer of $SiO_2$ thereon. Next, a lubricant comprising perfluoro-polyether was applied onto the protective layer through dipping to form a lubricative layer thereon. Thus were obtained magnetic disks for MR heads.

The magnetic disks were subjected to a gliding test. A distance is set at 40–50 μm between the glass substrate and the MR head. If the glass substrate is deformed or strained, the head crush will take place. Or if the glass substrate has a frigger which is caused by extracting of alkali and staining, also the head crush will take place. However, neither hitting nor crushing was seen. No defects were found in the films of the magnetic layers and other layers.

In addition, the magnetic disks were further tested for their weather resistance and life. In this test, the surface of the glass substrates was not deteriorated at all, and the magnetic layers and other layers were also not deteriorated and had no defects.

EXAMPLE 15

On the both surfaces of the glass substrates for magnetic disks that had been prepared in Examples 1 to 11, formed were a lower underlying layer of Cr, an upper underlying layer of CrMo, a magnetic layer of CoPtCr, and a protective layer of C in that order in an in-line-type sputtering device to produce magnetic disks.

These magnetic disks were tested in the same manner as in Example 14, and all were found good like in Example 14.

EXAMPLE 16

Magnetic disks for thin-film heads were produced in the same manner as in Example 15, except that the underlying layer was of Al/Cr/Cr and the magnetic layer was of CoNi-CrTa.

These magnetic disks were tested in the same manner as in Example 14, and all were found good like in Example 14.

Some preferred embodiments of the invention have been illustrated hereinabove with reference to their Examples as above, which, however, are not intended to restrict the scope of the invention.

For example, the heating temperature for the treatment with the molten salt of pyrosulfates and others, the type of pyrosulfates to be used, and the time for immersion in the molten salt are not limited to those in the Examples as above, but could be suitably varied or modified depending on the intended quality level of the products.

If desired, the substrates may be washed in any stage in the process of producing them.

In the invention, as described hereinabove, substrates for information recording media are treated with a molten salt of hydrogensulfates and others by immersing them in the molten salt, whereby alkali extract from the substrates is much retarded. Therefore, the substrates, especially glass substrates having been treated in the invention are deteriorated little, and have few burnt spots and impurities on their surfaces. Burnt spots and impurities will be caused by the movement of alkali metal ions onto the surface of glass substrates.

In particular, in the invention, water is supplied to the processing liquid. Therefore, during the treatment with a molten salt of pyrosulfates in the invention, enough water exists all the time in the processing system to prevent precipitation of pyrosulfate crystals that may be caused by vaporization of water, and the effect of the treatment is not attenuated. In the method of the invention, the effect of the treatment with the molten salt lasts long, and the substrates can be uniformly and continuously processed with the molten salt for a long period of time.

In addition, according to the method of the invention, releasing alkaline earth elements, Si, Sb and other components from substrates can be effectively retarded. As a result, the substrates having been treated in the invention could have improved waterproof and acid resistance.

In the information recording media of the invention, use is made of glass substrates from which extract alkali and other components are prevented almost completely. Therefore, the information recording media has good weather resistance, their life is long, and their reliability is high.

While the invention has been described in detail and with reference to specific embodiments thereof, it will be apparent to one skilled in the art that various changes and modifications can be made therein without departing from the spirit and scope thereof.

What is claimed is:
1. A method of producing a substrate for information recording media, said substrate containing a glass as a main component, said method comprising a first step of retarding the extract of the glass component from the substrate by contacting it with a molten salt consisting essentially of one selected from the group consisting of a hydrogen-sulfate, a pyrosulfate, and a mixture of the hydrogen-sulfate and the pyrosulfate, and a step of retarding the crystallization of the molten salt.

2. The method as claimed in claim 1, wherein said second step is carried out during said first step.

3. The method as claimed in claim 1, wherein said first step is carried out before or after said second step.

4. The method as claimed in claim 1, wherein the glass component to be prevented from being extracted from the substrate is a group of alkali ions.

5. The method as claimed in claim 1, wherein said step of retarding the crystallization of the molten salt is a water addition treatment comprising supplying water to the molten salt.

6. The method as claimed in claim 1, wherein said step of retarding the crystallization of the molten salt is a water addition treatment comprising compensating for water being away from the molten salt.

7. The method as claimed in claim 5, wherein said water addition treatment is a process selected from the group consisting of introducing steam into the molten salt, putting the molten salt in a steam atmosphere, and adding a hydrogen-sulfate to the molten salt.

8. The method as claimed in claim 6, wherein said water addition treatment is a process selected from the group consisting of introducing steam into the molten salt, putting the molten salt in a steam atmosphere, and adding a hydrogen-sulfate to the molten salt.

9. The method as claimed in claim 1, wherein said molten salt further contains sulfuric acid.

10. The method as claimed in claim 1, wherein the molten salt is reduced in temperature to a temperature selected from the group consisting of a melting point and a temperature between the liquid-phase temperature of the molten salt and 500° C.

11. The method as claimed in claim 1, wherein said substrate to be treated is one selected from a crystallized glass substrate and a glass substrate having been subjected to chemical strengthening treatment.

12. The method as claimed in claim 2, wherein said substrate is for magnetic disks to be reproduced with magnetoresistance heads.

13. The method as claimed in claim 1, wherein said steps are carried out at a temperature at least 50° lower than that in a chemically strengthening treatment after said chemically strengthening treatment.

14. An information recording medium using a substrate for information recording media produced by the method of claim 1.

15. The information recording medium as claimed in claim 14, further comprising a recording layer formed upward said substrate.

16. A method of producing a glass article, said glass article containing a glass as a main component, said method comprising a first step of retarding the extract of the glass component from the substrate by contacting it with a molten salt consisting essentially of one selected from the group consisting of a hydrogen-sulfate, a pyrosulfate, and a mixture of the hydrogen-sulfate and the pyrosulfate, and a second step of retarding the crystallization of the molten salt.

17. The method as claimed in claim 16, wherein said second step is carried out during said first step.

18. The method as claimed in claim 16, wherein said first step is carried out before or after said second step.

19. The method as claimed in claim 16, wherein said first step is carried out at a temperature lower than a sublimation temperature of said molten salt.

* * * * *